(12) United States Patent
Aiello et al.

(10) Patent No.: US 10,469,686 B2
(45) Date of Patent: Nov. 5, 2019

(54) METHOD AND SYSTEM FOR VALIDATING A HOLOGRAM ON A DOCUMENT

(71) Applicant: OCR Labs Pty Ltd, Bella vista (AU)

(72) Inventors: Daniel Aiello, St. Ives (AU); Matthew Adams, Kings Langley (AU)

(73) Assignee: OCR Labs Pty Ltd, Bella Vista (AU)

( * ) Notice: Subject to any disclaimer, the term of this patent is extended or adjusted under 35 U.S.C. 154(b) by 0 days.

(21) Appl. No.: 15/717,236

(22) Filed: Sep. 27, 2017

(65) Prior Publication Data

US 2018/0091672 A1 Mar. 29, 2018

(30) Foreign Application Priority Data

Sep. 27, 2016 (AU) ................................ 2016903902

(51) Int. Cl.
*H04N 1/00* (2006.01)
(52) U.S. Cl.
CPC ..... *H04N 1/00737* (2013.01); *H04N 1/00029* (2013.01); *H04N 1/00769* (2013.01)
(58) Field of Classification Search
None
See application file for complete search history.

(56) References Cited

U.S. PATENT DOCUMENTS

| | | | |
|---|---|---|---|
| 9,721,147 B1* | 8/2017 | Kapczynski | G06Q 50/265 |
| 2006/0236115 A1* | 10/2006 | Haneda | G06K 19/08 |
| | | | 713/182 |
| 2010/0328741 A1* | 12/2010 | Cheverton | G03H 1/0011 |
| | | | 359/2 |
| 2018/0046856 A1* | 2/2018 | Kapczynski | G06Q 50/265 |
| 2018/0091672 A1* | 3/2018 | Aiello | H04N 1/00737 |

OTHER PUBLICATIONS

A. Hartl, J. Grubert, D. Schmalstieg and G. Reitmayr, "Mobile interactive hologram verification," 2013 IEEE International Symposium on Mixed and Augmented Reality (ISMAR), Adelaide, SA, 2013, pp. 75-82.doi: 10.1109/ISMAR.2013.6671766 (Year: 2013).*

* cited by examiner

*Primary Examiner* — Tahmina N Ansari
(74) *Attorney, Agent, or Firm* — Weide & Miller, Ltd.

(57) ABSTRACT

A system for validating a hologram on a document is provided. The system includes a camera for taking plurality of images of the hologram, a memory for storing the plurality of images, a display for displaying at least one of the images and for instructing a user to rotate the document such that at least two of the images are taken from different hologram viewing angles, and a processor for analysing the characteristics of the hologram in each of the plurality of images and for determining whether any of the characteristics match a predetermined characteristic set for a predetermined hologram type.

12 Claims, 7 Drawing Sheets

METHOD AND SYSTEM FOR VALIDATING A HOLOGRAM ON A DOCUMENT

CROSS-REFERENCE TO RELATED APPLICATION

This application claims priority to Australian Application No. 2016903902 which was filed on Sep. 27, 2016, the contents of which are incorporated by reference.

FIELD

The present invention relates to fraud detection systems and in particular to automated hologram validation.

The invention has been developed primarily for use with a mobile phone camera and will be described hereinafter with reference to this application. However, it will be appreciated that the invention is not limited to this particular field of use and can be used in other applications and with other types of cameras, for example, as those installed on tablet computers, laptops and webcams.

BACKGROUND

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Throughout the specification and claims which follow, unless the context requires otherwise, the word "comprise", and other variations such as "comprises" and "comprising", will be understood to imply the inclusion of a stated integer or step or group of integers or steps but not the exclusion of any other integer or step or group of integers of steps.

Many service providers require clients' to be formally identified before being able to provide them with services. Identification of a client is usually performed using a government issued document such as a driver's license, birth certificate, proof of age card, passport, student card or healthcare card. In some instances a non-government document or card may also be used such as a credit card, bank card, student ID card or private healthcare card. In the prior art, identification documents have been validated and proofed by a human operator. Human operators are also trained on fraud detection and look out for fraudulent documents. With the expansion of mobile phone use it is now possible to collect copies of identification documents using the mobile phone camera and an application or app installed on the phone or running on the web.

In the prior art, identification documents have been validated and proofed by a human operator. Human operators are also trained on fraud detection and look out for fraudulent documents. With the expansion of mobile phone use it is now possible to collect copies of identification documents using the mobile phone camera and an application or app installed on the phone or running on the web.

However, digital copies of identification documents cannot always collect and capture all information stored on identification documents such as holograms and watermarks and as such there is an increased risk of fraud when capturing these documents electronically.

In addition not having to present original documents also open the opportunity for fraudulent and counterfeit documents.

SUMMARY

Preferred embodiments of the present invention overcome or ameliorate at least one of the disadvantages of the prior art, or to provide a useful alternative.

According to a first aspect of the invention there is provided a system for validating a hologram on a document, the system including: a camera for taking plurality of images of the hologram; a memory for storing the plurality of images; a display for displaying at least one of the images and for instructing a user to rotate the document such that at least two of the images are taken from different hologram viewing angles; a processor for analysing the characteristics of the hologram in each of the plurality of images and for determining whether any of the characteristics match a predetermined characteristic set for a predetermined hologram type. Preferably the camera, memory, display and processor form part of a portable electronic device. Preferably the portable electronic device runs a software application that provides for instruction the user to rotate the document. Preferably the hologram on document is validated as genuine if the characteristics of the hologram match a predetermined character set for a predetermined hologram type. Preferably the hologram on document is non-genuine if the characteristics of the hologram do not match a predetermined character set for a predetermined hologram type. Preferably the camera takes a series of images of the hologram and wherein the series of images are shown in real time on the display. Preferably the display includes graphical instructions to the user on how to rotate the document. Preferably the display provides a graphical depiction of the areas of the document that have been validated in one colour and the areas of the document that have not yet been validated in another colour. Preferably the series of images includes images of the entire document.

According to a second aspect of the invention there is provided a system for validating a hologram on a document, the system including: a camera for taking plurality of images of the hologram, at least two of the images being taken from different hologram viewing angles; a memory for storing the plurality of images; a processor for analysing the characteristics of the hologram from the plurality of images and for determining whether any of the characteristics match a predetermined characteristic set for a predetermined hologram type.

According to a third aspect of the invention there is provided a method for validating a hologram on a document, the method including the steps of: providing a camera for taking plurality of images of the hologram, at least two of the images being taken from different hologram viewing angles; providing a memory for storing the plurality of images; and providing a processor for analysing the characteristics of the hologram from the plurality of images and for determining whether any of the characteristics match a predetermined characteristic set for a predetermined hologram type.

Another preferred embodiment of the invention provides a system and method of using a mobile phone having a camera to collect and validate information from identification documents and other documents. The system and method advantageously facilitates the detection and validation of holograms on identification documents and other documents. This is preferably done without the need for validation by a human operator and allows the collection and utilisation of holograms as a security feature without the need to present the original document as the hologram can be verified using a series of 2 dimensional images. By detecting and utilising the security features of the document and utilising the built in holograms there is provided an improved level of fraud detection and the improved ability to determine whether a presented document is original.

The preferred embodiment of the invention utilises a hinged and/or pivoting mechanism of detecting and analysing holograms wherein a camera on a mobile phone takes a stream or series of photographs of the hologram on the document. Photographs of the hologram are taken in a consecutive stream while the document is rotated and the camera held still thereby allowing the camera to take a stream of photos of the hologram at different angles that allows the capture of different hologram viewpoints. By comparing the photographed hologram viewpoints with a predetermined verified and known genuine hologram, the preferred embodiment of the invention can determine whether the hologram being photographed is likely to be genuine or likely to be counterfeit. Processing of the photographs or images is done on a mobile phone in the preferred embodiment although in some embodiments images can be processed on a server if necessary or advantageous.

Embodiments of the invention can be used to detect, analyse and verify a plurality of security features built into documents using directional analysis of the document. This analysis compares how the view of a document and the built in security features of the document (such as holograms and watermarks) changes according to the different angle from which the document and security features are viewed. By taking a series of photographs of the document and security features from a plurality of angles, the view from any number of predetermined angles can be compared to that of a known genuine document and/or security feature. It is therefore possible to automatically analyse the patterns of a known genuine document and its security features to use this as a baseline with which to compare a document to be verified. Preferred embodiments of the invention provide for a database of known genuine documents and their security features and characteristics by allowing a system manager to record the characteristics of genuine documents. This is done by capturing the patterns or characteristics of a genuine document by taking a series of photographs of the genuine document while pivoting or rotating the document around a fixed camera and recording and analysing the series of photographs captured. In this manner a document to verified is compared to a known genuine document to determine the likelihood of the document to be genuine or a counterfeit.

Embodiments of the invention can be applied to analyse other security features in documents or bank notes that use an image or images for detection such as font and alignment to broaden and improve the detection of counterfeit documents.

BRIEF DESCRIPTION OF THE DRAWINGS

A preferred embodiment of the invention will now be described, by way of example only, with reference to the accompanying drawings in which.

DETAILED DESCRIPTION OF THE EMBODIMENTS

Figure 1:
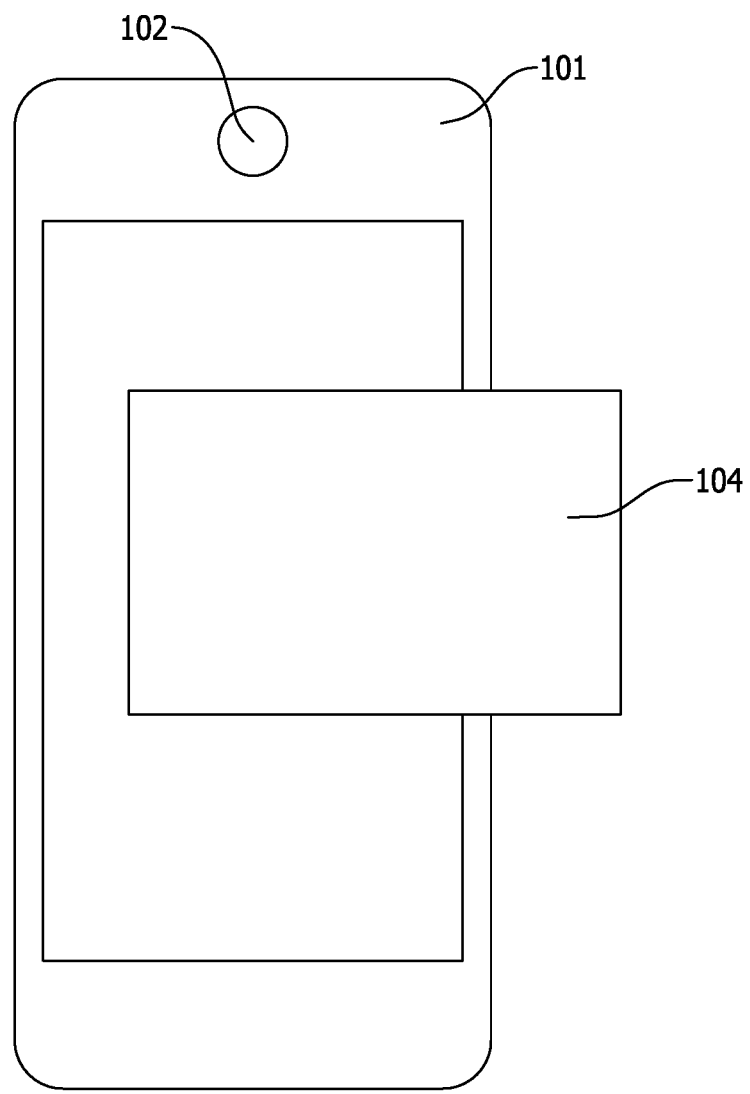
FIG. 1 shows a diagram of a mobile phone capturing information from an identification document according to the preferred embodiment of the invention.

The preferred embodiment of the invention provides a system and method of using a mobile phone having a camera to collect and validate information from identification documents and other documents. The system and method advantageously facilitates the detection and validation of holograms on identification documents and other documents. This is preferably done without the need for validation by a human operator and allows the collection and utilisation of holograms as a security feature without the need to present the original document as the hologram can be verified using a series of 2 dimensional images. By detecting and utilising the security features of the document and utilising the built in holograms there is provided an improved level of fraud detection and the improved ability to determine whether a presented document is original.

The preferred embodiment of the invention utilises a hinged and/or pivoting mechanism of detecting and analysing holograms wherein a camera on a mobile phone takes a stream or series of photographs of the hologram on the document. Photographs of the hologram are taken in a consecutive stream while the document is rotated and the camera held still thereby allowing the camera to take a stream of photos of the hologram at different angles that allows the capture of different hologram viewpoints. By comparing the photographed hologram viewpoints with a predetermined verified and known genuine hologram, the preferred embodiment of the invention can determine whether the hologram being photographed is likely to be genuine or likely to be counterfeit.

Embodiments of the invention can be used to detect, analyse and verify a plurality of security features built into documents using directional analysis of the document. This analysis compares how the view of a document and the built in security features of the document (such as holograms and watermarks) changes according to the different angle from which the document and security features are viewed. By taking a series of photographs of the document and security features from a plurality of angles, the view from any number of predetermined angles can be compared to that of a known genuine document and/or security feature. It is therefore possible to automatically analyse the patterns of a known genuine document and its security features to use this as a baseline with which to compare a document to be verified. Preferred embodiments of the invention provide for a database of known genuine documents and their security features and characteristics by allowing a system manager to record the characteristics of genuine documents. This is done by capturing the patterns or characteristics of a genuine document by taking a series of photographs of the genuine document while pivoting or rotating the document around a fixed camera and recording and analysing the series of photographs captured. In this manner a document to be verified is compared to a known genuine document to determine the likelihood of the document to be genuine or a counterfeit.

Embodiments of the invention can be applied to analyse other security features in documents or bank notes that use an image or images for detection such as font and alignment to broaden and improve the detection of counterfeit documents.

Referring to FIG. 1, there is a shown a mobile phone 101 having a front camera 102 and back camera 103. A user 105 opens an App running on the phone and captures information from an identity document 104 with either the front or back camera. Examples of identity documents include passports, drivers licenses, bank notes, title deed documents as non-limiting examples. As would be understood any type of document having a hologram can be used within embodiments of the system and there is no limitation to the specific type of document or card type. To capture the information from the document, the user focuses either the front or back camera on the document. The camera takes at least one photograph, but preferably a series of photos or a video clip of the document and the app attempts to determine the type of identification document being held up from the information captured. The system preferably is pre populated with a plurality of different types of documents including identity documents from any jurisdiction or location as required. For example in countries where states or territories are responsible for licensing then each jurisdiction may have a different driver's license. Each license may have a different layout and different security measures including different holograms. To ensure the app works for any jurisdiction in the country, the format for each license is stored in the system and is searchable by the app when it scans a document.

Once the document images are captured, the information obtained is checked to identify the form or type of document that is being held up. Along with the form of document is stored the hologram matrix information for each document type stored. The hologram matrix format is the assigned hologram style, design and positioning for a document type as applied by the issuing authority it originates from.

Once the app has determined the type of document being help up and the associated hologram information, the app proceeds to instruct the user how to manoeuvre the document so that that the app can take photographs of the hologram from a plurality of different angles so as to verify the authenticity of the hologram and associated document. This is termed the directional analysis. At this stage the app also performs OCR (optical character recognition) extraction on the document to extract the relevant information contained on the document.

Figure 2:
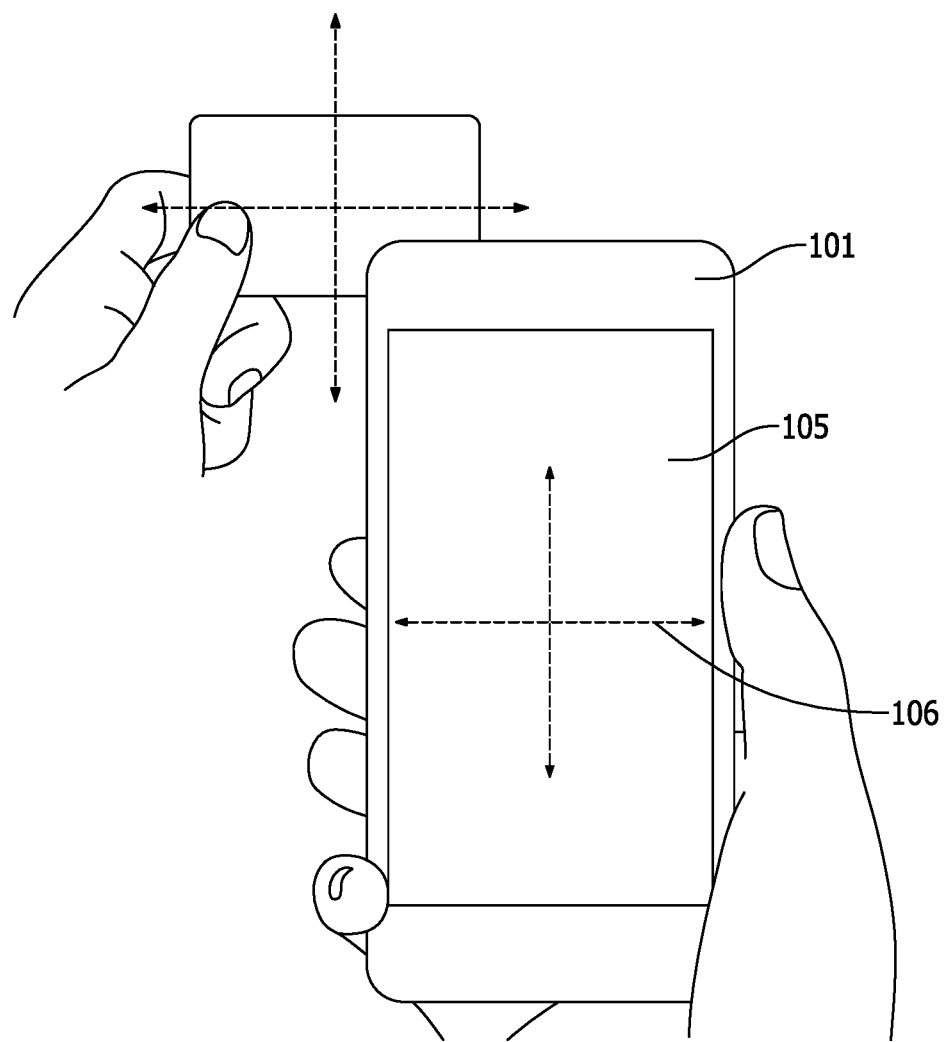
FIG. 2 shows a diagram of a mobile phone capturing information from an identification document according to the preferred embodiment of the invention.

Referring to FIG. 2 there is shown an example of the directional analysis in which the app instructs the user on how to manoeuvre the identification document so as to allow the app and camera to take the necessary photographs to correctly analyse the hologram.

Using phone 101, user is prompted on the phone screen 105 to move the ID in the way of the directional lines 106 as directed. Using the directional analysis images of the ID are captured from a plurality of angles and any holograms are identified and captured. If the card type is know then the app instructs the user to move the card in a predetermined manner to capture the holograms know to be on a genuine card. In this way the app can direct the user to manoeuvre the ID as required so that it may collect the required images from each part of the card on which holograms are expected to be present.

Within the app, the lighting in the environment is checked to ensure that there is no over saturation of light or darkness and adjustments to the camera are made if these are detected. Once the camera activates it will start capturing a series of photos passing this in real-time to the app. When the user has placed the ID in line with the correct angle and the app has taken enough images of the area to determine if the hologram matches with what is on file for that angle the app instructs the user to manoeuvre the ID to the next area to be analysed.

Figure 3:
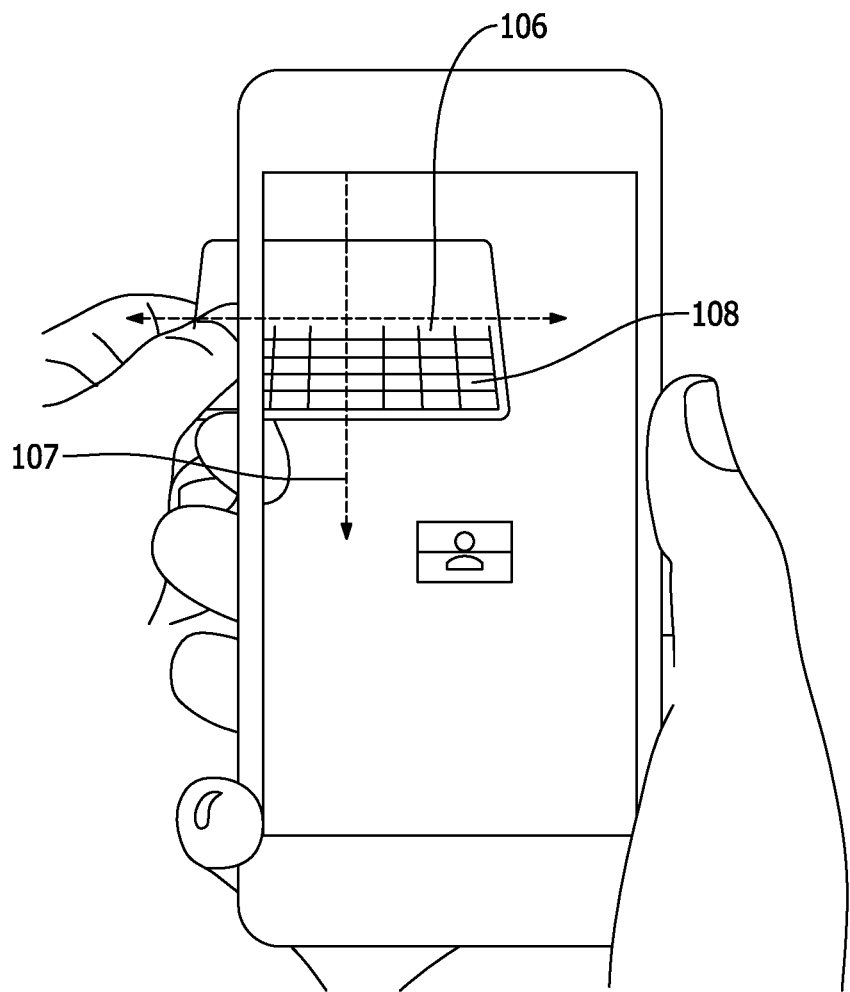
FIG. 3 shows a diagram of a mobile phone capturing information from an identification document according to the preferred embodiment of the invention.
Figure 4:
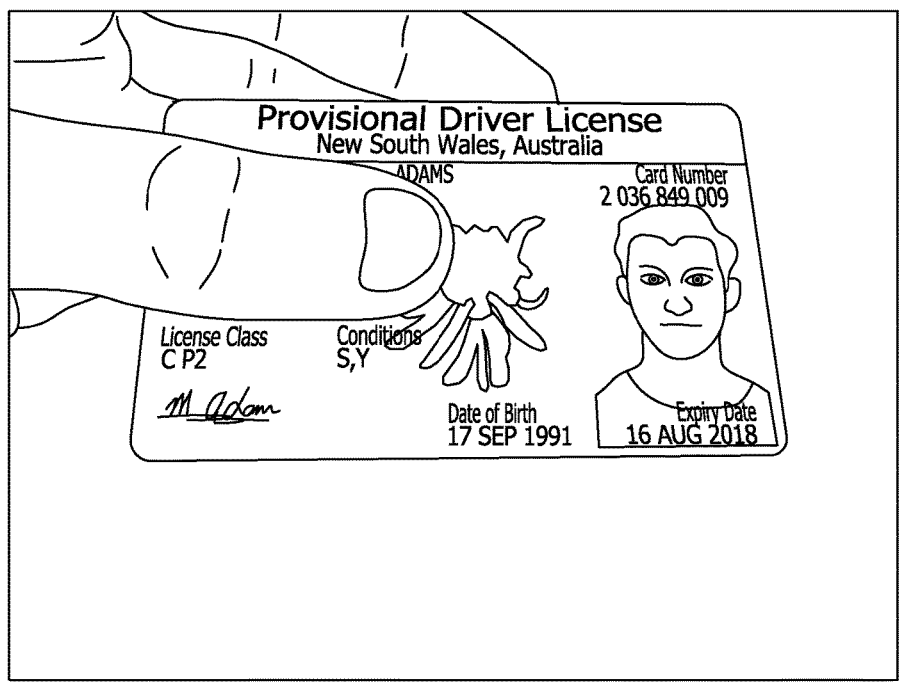
FIG. 4 shows a photo of an identification document with a hologram according to the preferred embodiment of the invention.

Referring to FIG. 3, the user is asked to move the card in the direction of the arrows. In this example the user as depicted is moving the card in a downward vertical motion. The holograms on the ID are exposed as seen in FIG. 4. Each pass of the vertical or horizontal movement is captured and the series of images are compared against the trained analysis in pattern that has been trained into the app engine.

While it is possible to take a single series of images for each area of the card and then conduct the analysis, for increased accuracy the software engine determines the adequate amount images series that should be taken for each area of the ID. Once each area of the ID has been suitably exposed and the required images captured to perform the analysis then the user will be advised to move to another area of the ID or that the process is complete.

The process of capturing sufficient images is known as confidence building to sufficiently read and analyse the security features on the ID. The user will be notified that the confidence level is at an acceptable rate when the directional arrows on the app turn to green 107 and the small card thumbnail for that part that is captured turns green 108.

Referring to FIG. 4 the user continues to move the ID as directed in vertical movements and with up and down motion to get a sufficient analysis of the ID surface. Depending on the ID card type and the lightning conditions of the environment, a flash on the mobile may be utilised to assist in identifying holograms. Use of the flash can in some instances assist in prominently showing various hologram types and colour variations.

Figure 5:
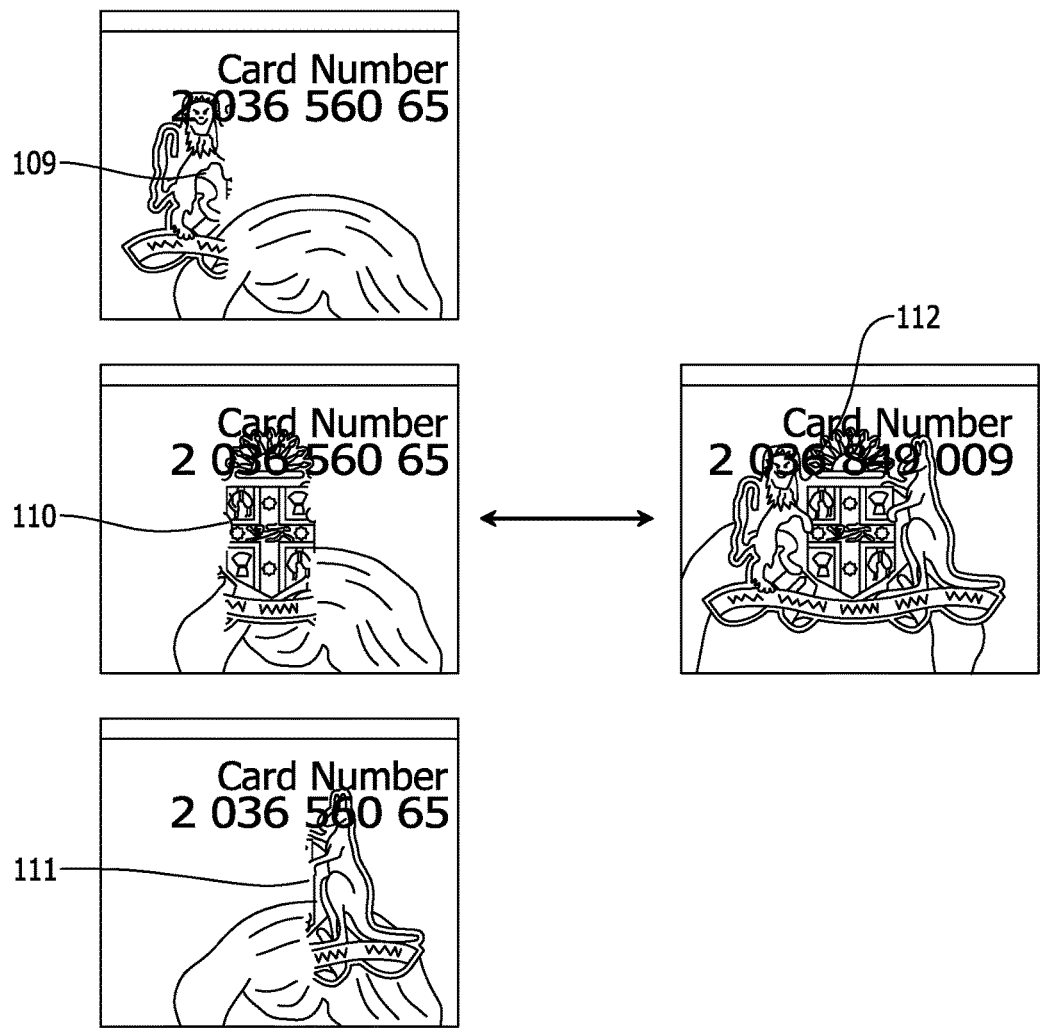
FIG. 5 shows a photo of the hologram of FIG. 4 at different viewing angles according to the preferred embodiment of the invention.

Referring to FIG. 5 the process allows for pattern matching of holograms at various angles. Each hologram reacts differently to at different angles and different dimensional situations along with different variations of luminosity in the ambient environment. Using the directional analysis the app is able to detect the various reactions of the hologram security feature as illustrated in FIG. 5. The reactions are then compare to how that specific hologram is expected to react in the given environment.

In the example of FIG. 5, there are 3 expected visual possibilities for the genuine hologram. These are depicted as 109, 110 and 111 that show visual outcomes for this hologram type with various light hitting. Through analysing the image of the hologram actually taken the app matches the hologram style and also match it with a possible hologram reaction. The app is also able to match the hologram with the alignments expected on the ID and the exact placement of the hologram on the ID. In this way the system can determine the likelihood of a hologram and ID being genuine or fake.

Figure 6:
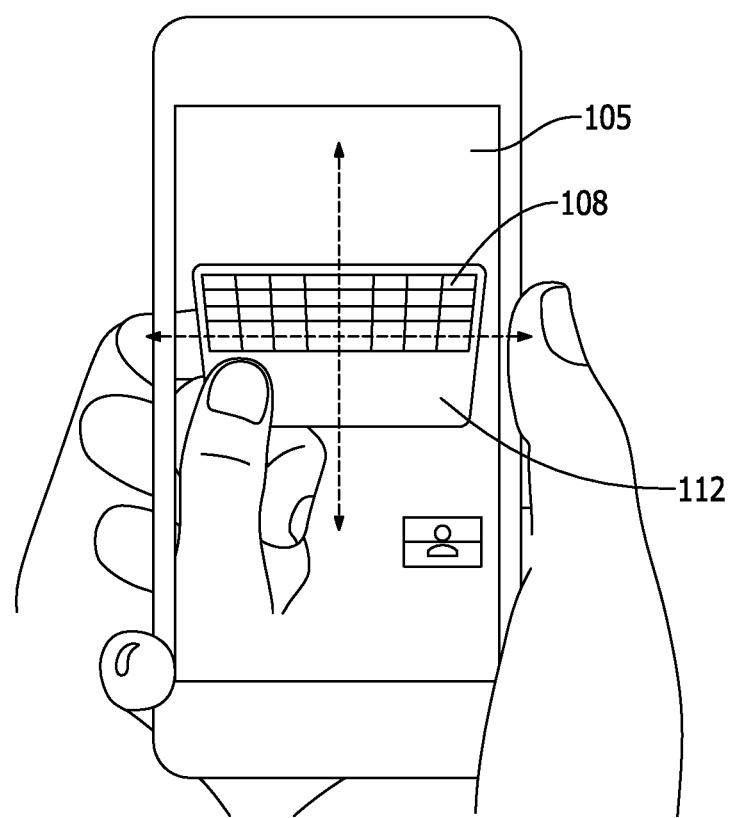
FIG. 6 shows a diagram of a mobile phone capturing information from an identification document according to the preferred embodiment of the invention.

Referring to FIG. 6 there is shown the user moving the ID its upper axis fulfilling the requirements of the directional analysis on the ID card's surface. As can be seen on the screen 105 the image of the card 112 turns green 108 where analysis is complete.

Figure 7:
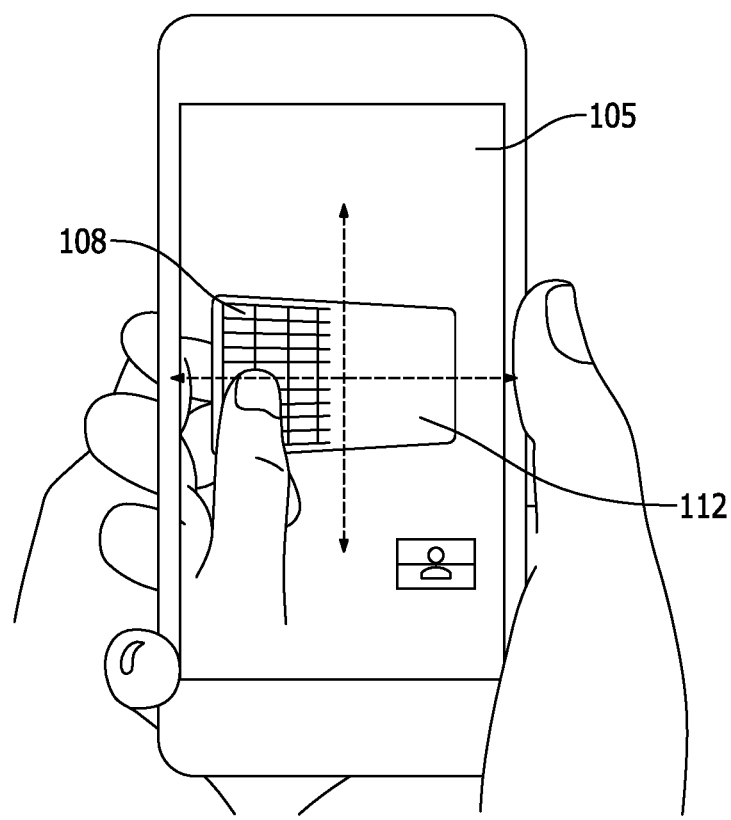
FIG. 7 shows a diagram of a mobile phone capturing information from an identification document according to the preferred embodiment of the invention.

Referring to FIG. 7 there is shown the user moving the ID on its left axis fulfilling the requirements of the directional analysis on the ID card's surface. As can be seen on the screen 105 the image of the card 112 turns green 108 where analysis is complete.

If no holograms are detected by the end of the process, the results indicate that the card being imaged may be counterfeit and the user may be required to verify their identification by other means. In some instances the user is not notified that validation has failed and in some instances details of a suspected fraudulent document may be provided to the relevant authorities. In some embodiments the user is prompted to try an alternate identification document.

As would be understood features of different embodiments can be combined as required to suite the particular application.

Embodiments of the invention can be performed using any mobile phone or tablet computer. These include by way of non limiting example Apple™ iPhone, iPad, Android phones and tablets, Samsung smart phones and tablets.

There are hundreds of available computer languages that may be used to implement embodiments of the invention, among the more common being Ada; Algol; APL; awk; Basic; C; C++; Cobol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; and XML.

Any commercial processor may be used to implement the embodiments of the invention either as a single processor, serial or parallel set of processors in the system. Examples of commercial processors include, but are not limited to Merced™, Pentium™, Pentium II™, Xeon™, Celeron™, Pentium Pro™, Efficeon™, Athlon, AMD, Intel Core™ i3, i5, i7 and the like.

Display screens may be segment display screen, analogue display screens, digital display screens, CRTs, LED screens, Plasma screens, liquid crystal diode screens, and the like.

Although the invention has been described with reference to specific examples, it will be appreciated by those skilled in the art that the invention may be embodied in many other forms.

What is claimed is:

1. A system for validating a hologram on a document, the system comprising:
   a camera configured to take a plurality of images of the hologram;
   a display configured to provide direction to a user of the system to rotate the document such that at least two of the images are taken from different hologram viewing angles;
   a processors configured to analyze characteristics of the hologram in each of the plurality of images and determine whether any of the characteristics match a predetermined characteristic set for a predetermined hologram type;
   a memory configured to store the plurality of images and instructions that allow the processor to analyze the characteristics of the hologram and, based on the analysis, control the display to provide directions to the user of the system to rotate the document on respect of the camera;
   wherein, in use, the processor continues to provide directions to the user of the system to rotate the document and control the camera to acquire images until the hologram is validated as genuine or non-genuine.

2. A system according to claim 1 wherein the camera, memory, display and processor form part of a portable electronic device.

3. A system according to claim 2 wherein the hologram on the document is validated as genuine if the characteristics of the hologram match a predetermined character set for a predetermined hologram type.

4. A system according to claim 2 wherein the hologram on the document is non-genuine if the characteristics of the hologram do not match a predetermined character set for a predetermined hologram type.

5. A system according to claim 1 wherein the camera takes a series of images of the hologram and wherein the series of images are shown in real time on the display.

6. A system according to claim 5 wherein the display provides graphical instructions to the user on how to rotate the document.

7. A system according to claim 5 wherein the display provides a graphical depiction of the areas of the document that have been validated in one color and the areas of the document that have not yet been validated in another color.

8. A system according to claim 5 wherein the series of images includes images of the entire document.

9. A method for validating a hologram on a document, the method comprising the steps of:
   (a) taking at least one image of a hologram using a camera;
   (b) storing the at least one image in a memory;
   (c) analyzing, using a processor, the characteristics of the hologram in the at least one image to determine whether any of the characteristics match a predetermined characteristic set for a predetermined hologram type;
   (d) attempting to validate, based on the results of the analyzing step, whether the hologram is genuine or non-genuine with a predetermined level of confidence; and
   (e) if the predetermined level of confidence for validation is not met, providing directions to a user through a display to rotate the document in relation to the camera to change the relative angle between the hologram and the camera and repeating steps (a)-(d).

10. The method of claim 9, further comprising the step of displaying, a validation status and associated level of confidence to the user in real time.

11. The method of claim 9, further comprising the step of displaying directions for the user to guide the user to rotate the document in relation to the camera in a specific direction.

12. The method of claim 9, wherein the step of analyzing comprises using directional analysis to detect reactions of a security feature of the hologram for different angles and different luminosity levels.

* * * * *

UNITED STATES PATENT AND TRADEMARK OFFICE
CERTIFICATE OF CORRECTION

PATENT NO.            : 10,469,686 B2                            Page 1 of 1
APPLICATION NO.       : 15/717236
DATED                 : November 5, 2019
INVENTOR(S)           : Daniel Aiello and Matthew Adams It is certified that error appears in the above-identified patent and that said Letters Patent is hereby corrected as shown below:

In the Claims

Column 7, Claim 1, Line 53, "a processors configured to analyze characteristics of the" is misspelled and should read:
--a processor configured to analyze characteristics of the--

Signed and Sealed this
Fourteenth Day of January, 2020

Andrei Iancu
*Director of the United States Patent and Trademark Office*